Figure 1:
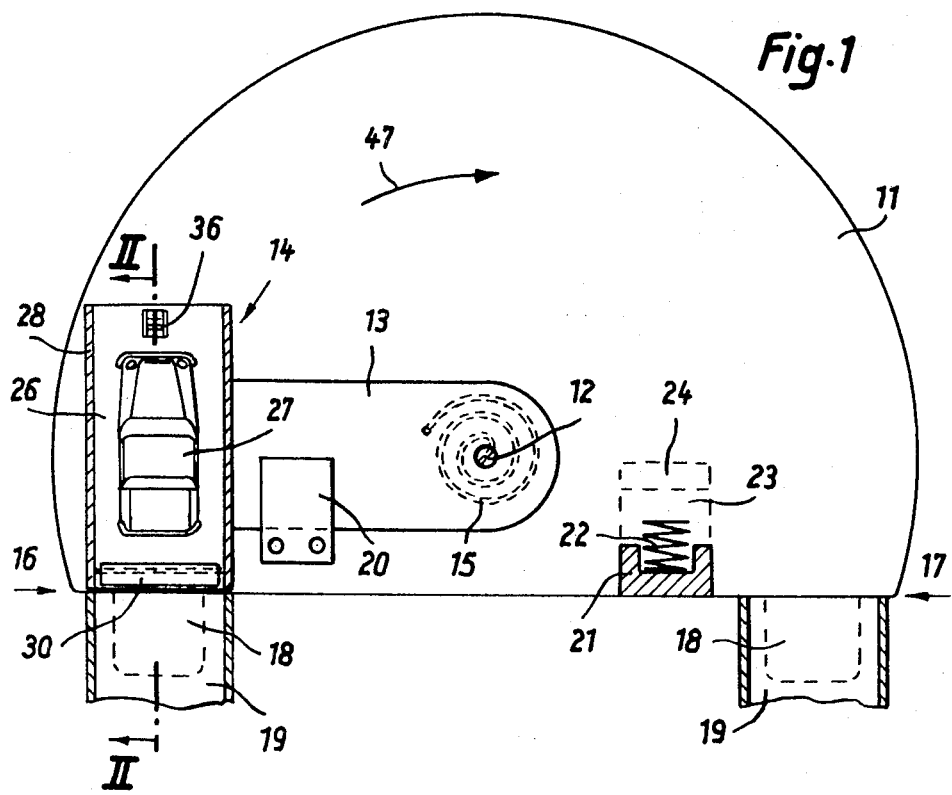

United States Patent

[11] 3,600,849

| | | |
|---|---|---|
| [72] | Inventor | Edwin Faller<br>Gutenbach, Germany |
| [21] | Appl. No | 7,874 |
| [22] | Filed | Feb. 2, 1970 |
| [45] | Patented | Aug. 24, 1971 |
| [73] | Assignee | Gebr. Faller GmbH<br>Gutenbach, Germany |
| [32] | Priority | Feb. 4, 1969 |
| [33] | | Germany |
| [31] | | P 19 05 261.0 |

[54] MODEL VEHICLES
23 Claims, 8 Drawing Figs.

[52] U.S. Cl. ............................................... 46/202,
46/1 K
[51] Int. Cl. ............................................. A63h 11/10
[50] Field of Search ........................................ 46/1, 201,
202, 221, 223

[56] References Cited
UNITED STATES PATENTS
3,209,491 10/1965 Roeper........................ 46/202 X Primary Examiner—Louis G. Mancene
Assistant Examiner—D. L. Weinhold
Attorney—Harness, Dickey & Pierce ABSTRACT: A device for accelerating model vehicles comprises a track portion movable relative to a base part by resilient means. The track portion is held in a cocked position by a trigger mechanism and is released when a vehicle entering the track portion from an incoming track trips the trigger mechanism. A movable barrier, displaced by the entering vehicle falls back behind the vehicle to accelerate the vehicle as the track portion is accelerated by the resilient means. The track portion may be movable in an arc through an angle, e.g. 180° about a vertical axis or in a circle about a horizontal axis or in a straight line.

INVENTOR.
Edwin Faller

PATENTED AUG 24 1971 3,600,849

SHEET 4 OF 4

INVENTOR.
Edwin Faller
BY
Harness, Dickey & Pierce
ATTORNEYS.

MODEL VEHICLES

The present invention relates to a device for accelerating model vehicles, such as model cars without self-propulsion.

Flexible tracks, which are usually made from plastics material and which are provided with lateral guides have been proposed for model vehicles. One end of the track is raised so that the cars are accelerated under gravity. Various obstacles or devices such as vertical loops, jump hazards etc. can be fitted into the track.

It would be desirable if the raising of the beginning of the track could be avoided and if the car could be accelerated again within the track after the car has slowed down, thus also eliminating the difficulty, frequently occurring, of satisfactorily supporting all the portions of a raised track.

Thus, a feature of the present invention is to provide a device which renders it possible to accelerate model vehicles in a simple manner between two points which are located substantially at the same height. Furthermore, the device itself is to contribute to the purpose of play, i.e. it is to be interesting and instructive to operate.

In accordance with the present invention, a device for accelerating model vehicles comprises a base part having an entry and an exit; a track portion which is movable with respect to the base part along a predetermined path between the entry and the exit; spring means operative between the base part and the track portion and urging the track portion from the entry to the exit; a releasable trigger mechanism for holding the track portion in a cocked state adjacent the entry; and a movable barrier on the track portion for preventing the model vehicle from running back.

The model vehicle runs up onto the track portion at a low speed from the entry. Previously, the track portion has been moved towards the entry against the force of the spring means and has been secured in cocked position by the trigger mechanism. When the trigger mechanism is actuated, the track portion moves towards the exit and carries along the model vehicle which is retained on the track portion by the barrier. When the track portion is arrested at the exit, the model vehicle leaves the track portion at a high speed.

Advantageously, the trigger mechanism can include a trigger which extends into the track portion and can be tripped by being struck by the model vehicle. The model vehicle can then run onto the track portion at a low speed and trip the trigger mechanism itself, whereupon the model vehicle is accelerated. For this purpose, the trigger mechanism can advantageously comprise a trigger in the form of a cranked lever pivotably mounted on the track portion, and a spring latch which is resiliently secured to the base part and which acts upon the track portion, one arm of the cranked lever acting upon the spring latch for the purpose of releasing the latter. The cranked lever may be arranged in an opening in the track portion and substantially close the latter when in the released position. Thus advantageously, the trigger mechanism is of simple construction and functions very reliably. Due to its inertia, the cranked lever attached to the track portion is pivoted forwardly when the track portion is decelerated and closes the opening in which it is arranged, thus preventing one wheel of a, for example three-wheeled vehicle, from jamming in the opening.

The barrier, which prevents the model vehicle from running back while it is being accelerated, advantageously comprises a flap which depends from its pivotable bearing above the track portion and which is provided with a stop which prevents the flap from opening in the opposite direction to the direction of travel.

Advantageously, a buffer device is arranged in the region of the exit to prevent the unit comprising the track portion and its carrier from striking violently against this region. The buffer device may comprise for example a spring which absorbs the kinetic energy of the unit comprising the track portion and its carrier. However, it may also be advantageous to obtain the retardation by friction. For example, two resilient-plastics-material parts could be arranged in the region of the exit and clamp between them the carrier or parts of the track portion.

In accordance with an advantageous feature of the invention, the track portion is secured to a carrier which is pivotable about a substantially vertical axis on the base part, the entrance and the exit being spaced by an angle of traverse of about 180°. Thus, it is possible to reverse the direction of travel and simultaneously to accelerate a model vehicle. This provides the advantage that, with substantially the same spacial requirements, almost double the length of track can be laid in a room. In the case of uncontrolled model cars without self-propulsion, changing direction by curved pieces in the track would lead to a great loss of speed. The present invention not only eliminates the loss of speed but at the same time accelerates the model vehicle.

In accordance with a further advantageous feature of the invention, the track portion may be secured to a carrier which is mounted on the base part so as to be pivotable about a substantially horizontal axis, and the entrance and the exit may be spaced by an angle of traverse of about 360°. The model vehicle is thereby guided on a vertical, circular path together with the track portion and leaves the track portion at a high speed in the vicinity of the place at which it has travelled onto the track portion. This embodiment is particularly effective and, for example, also enables races to be undertaken on two adjacent tracks with intermediate acceleration. For this purpose two devices can be assembled in the form of a unit.

Advantageously, in a further embodiment, the track portion can be guided on the base part so as to move in a substantially straight path. In this device, the car is accelerated with out a change of direction.

Figure 2:
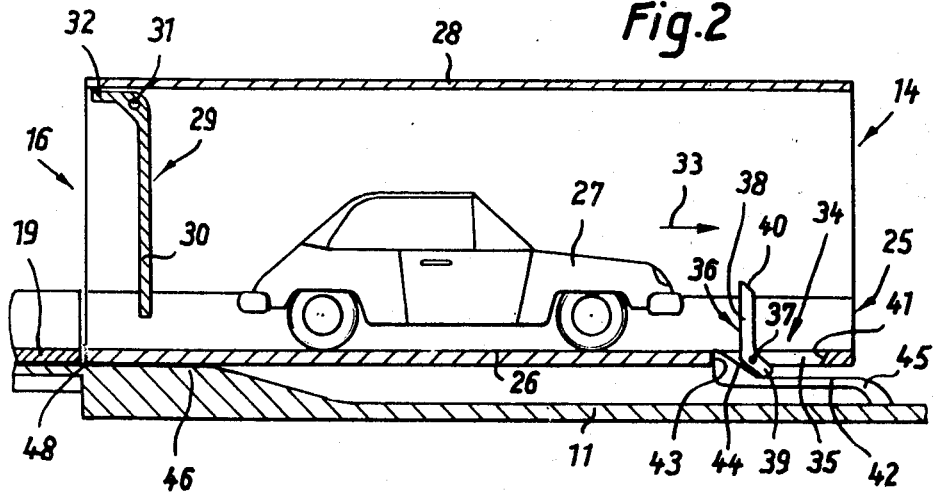
Figure 3:
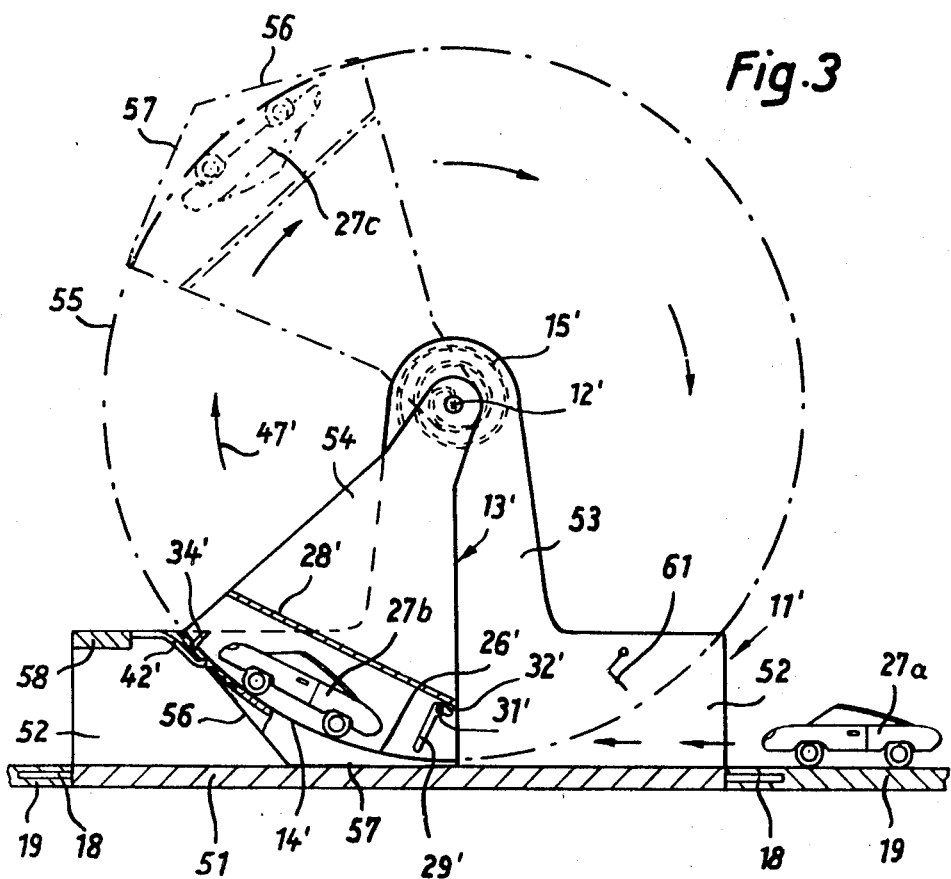
Figure 4:
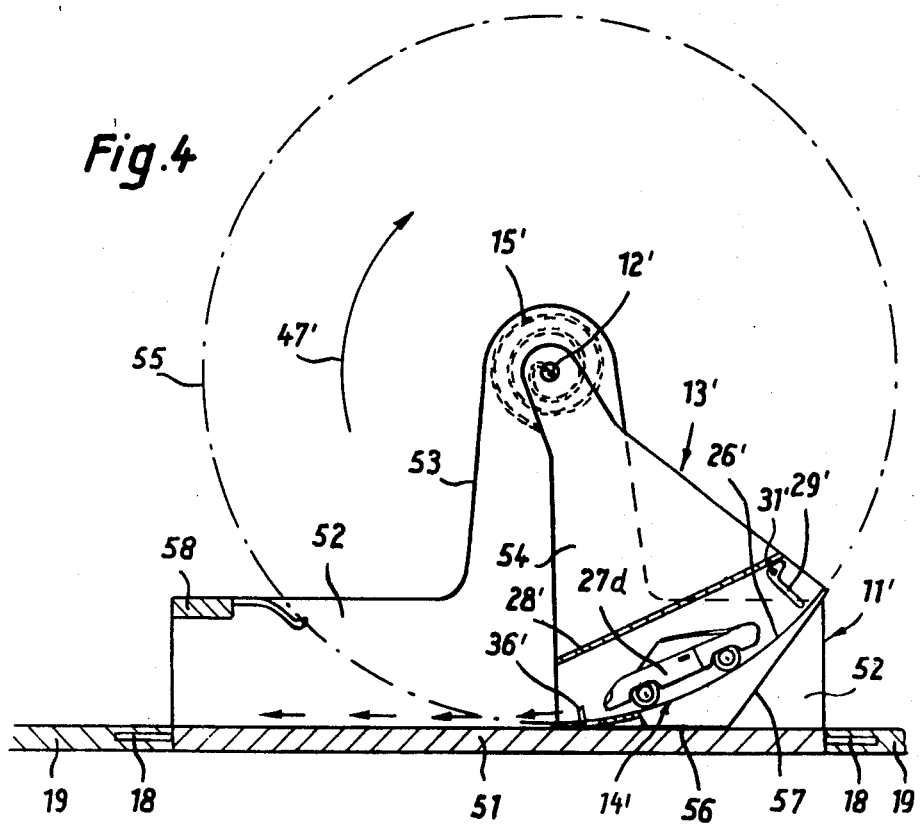
Figure 5:
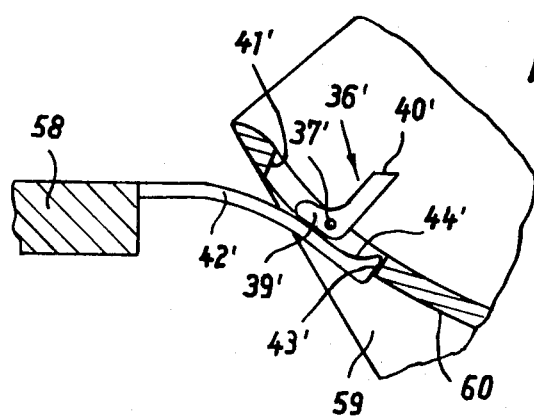
Figure 6:
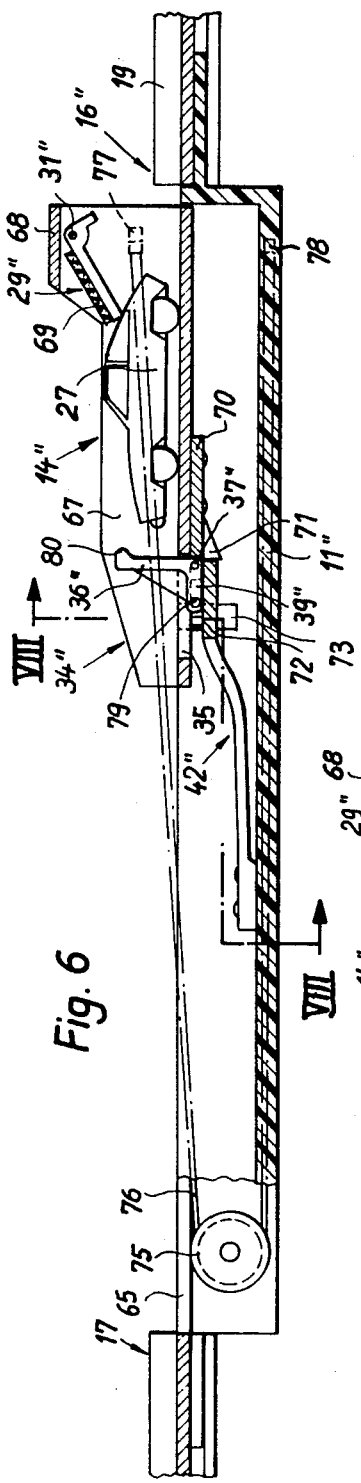
Figure 7:
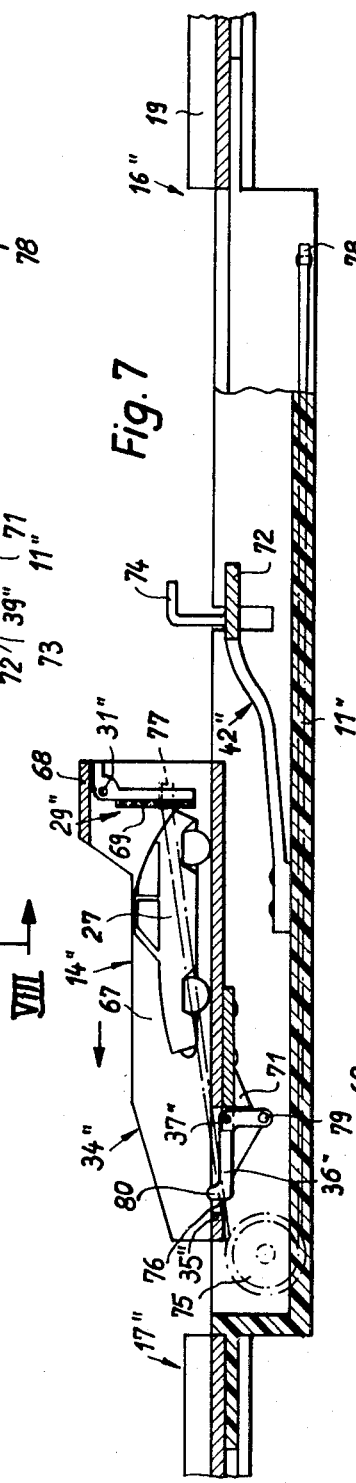
Figure 8:
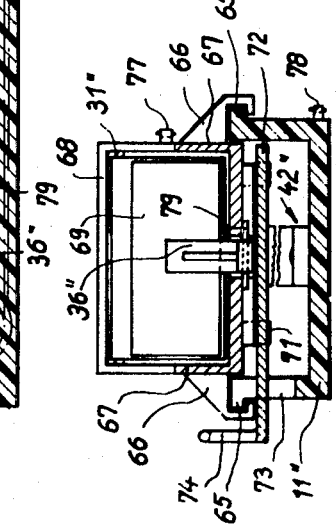

The invention is further described by way of example, with reference to the accompanying drawings, in which:

FIG. 1 is a plan view of one embodiment of model car accelerating device constructed in accordance with the invention;

FIG. 2 illustrates a detail from FIG. 1, shown in a section taken on the line 11—II in FIG. 1, FIG. 3 is a schematic side elevation of a second embodiment of accelerating device constructed in accordance with the invention, shown in the cocked state, FIG. 4 is a view corresponding to FIG. 3, shown in the released state, FIG. 5 is a detail section showing the trigger mechanism of the device illustrated in FIGS. 3 and 4, FIG. 6 is a fragmentary longitudinal section through an accelerating device constructed in accordance with a third embodiment of the invention, shown in a first position, FIG. 7 is a section corresponding to FIG. 6, shown in a second position, and FIG. 8 is a cross section taken on the line VIII—VIII in FIG. 6.

The model car accelerating device illustrated in FIGS. 1 and 2 includes a base part 11 which is substantially in the form of a somewhat more than semicircular plate and to which is secured a vertical axle 12. A carrier 13 also of plate-shaped construction is pivotably mounted on the axle 12, a track portion 14 being mounted at the end of the carrier 13 remote from the axle. A spring 15 or the like is interposed between the carrier and the base part 11 or the axle 12 secured on the latter. In the illustrated embodiment, the spring 15 is in the form of a spiral spring. Alternatively, however, the spring element may be in the form of a rubber strand wound onto a roller. The spring is arranged to urge the unit comprising the carrier and the track portion from an entry 16 to an exit 17. Connecting pieces 18 for contiguous tracks 19 are secured at the entry and exit 16, 17 respectively. A guide 20 is arranged on the base part 11 so that, when the carrier 13 is in its cocked state, the carrier 13 is guided in its vertical position in such a manner that a substantially smooth transition is ensured between the incoming track 19 and the track portion 14.

The carrier 13 at the end of its pivoting movement strikes against a stop 21 which is mounted at the exit 17. A spring 22 is inserted into the stop 21 in order to buffer the impact and is compressed before the carrier 13 strikes against the stop 21. The spring 22 is dimensioned so that its energy absorption is always less than the kinetic energy of the unit comprising the carrier and the track portion, i.e. so that there is still a certain impact against the stop 21. This ensures that no gap appears between the outgoing track 19 and the track portion 14 at the exit 17 as the car leaves the track portion 14. A vertical locating guide 23, 24 for the carrier 13 is also provided at the exit 17. The vertical guide 23, 24 is illustrated by broken lines in FIG. 1, since the stop 21 is illustrated in section. The portion 23 extends substantially horizontally, while the portion 24 of the guide is in the form of a ramp sloping slightly upwardly to ensure that the carrier 13 does not strike against the end face of the vertical locating guide.

The track portion 14 is illustrated in detail in FIG. 2. It comprises a track part 25 having a running surface 26 for the model vehicle 27, and side cheeks, thus resulting in a shallow channel-shaped cross section. A cover 28 is mounted onto the track part 25 and prevents the car from being thrown from the track during acceleration. Thus, the track part and the cover together form a tunnel for the vehicle being accelerated.

A barrier 29 is secured to the cover 28 immediately beyond the entry 16 at which the track 19 is connected to the base part 11. The barrier 29 comprises a flap 30 which normally hangs vertically downwardly and which is mounted so as to be pivotable about an axle 31. The flap 30 is provided with a stop 32 which is arranged in the direction opposite to the direction of travel (arrow 33) of the model vehicle 27 and which, by abutting against the cover 28, prevents the flap 30 from rotating beyond the vertical in the clockwise direction. A trigger mechanism 34 is arranged at the end of the track portion 14 located in the direction of travel. The trigger mechanism 34 comprises a trigger 36 which is arranged in an opening 35 in the running surface 26 and which is pivotable about an axle 37. The trigger 36 is in the form of a cranked lever having a long arm 38 which extends into the track of the model vehicle 27, and an arm 39 which is angled in the direction of travel. The axle 37 is located at the elbow between the two arms. The end face 40 of the arm 38 is chamfered and cooperates with a chamfered edge 41, located in the direction of travel, of the opening 35, so that the two chamferings together form a stop when the trigger 36 is pivoted in the clockwise direction. A spring latch 42 is mounted on the base part 11. The shape of the spring latch 42 is somewhat that of a horizontal "S." The end of the latch located in the direction opposite to the direction of travel is provided with a vertical stop face 43 and an oblique face 44. The spring latch 42 may be made from a resilient plastics material and its center portion extends substantially horizontally, i.e. parallel to the running surface 26. The end of the spring latch located in the direction of travel is secured to the base part 11 and is also provided with a chamfering or a rounding 45. A raised portion 46 may be provided on the base part 11 in the region of the entry 16 and, in cooperation with the guide 20, ensures that the track portion 14 is located at the same height as the track 19.

The device described with reference to FIGS. 1 and 2 operates in the following manner:

If the device is relieved of stress, the unit comprising the track portion 14 and the carrier 13 is pivoted in the opposite direction to the direction of rotation (arrow 47) so that the spring 15 is stressed. The edge 48, guided by the guide 20, first of all rides on the oblique surface 44 and depresses the spring latch 42. The spring latch then runs along the underside of the running surface 26 and finally engages into the opening 35. The arm 39 of the trigger 36 has previously come into contact wit the oblique surface 45, the trigger 36 thus being raised into the position illustrated in FIG. 2. A model vehicle 27 arriving from the incoming track 19 (on the left in FIG. 1) first of all strikes against the flap 30 and pivots the latter in the anticlockwise direction. The flap returns to its original vertical position after the model car has passed through the barrier 29.

The model vehicle then strikes against the long arm 38 of the trigger 36 and pivots the latter forwardly. The arm 39 of the trigger 36, which abuts against the center horizontal portion of the spring latch 42, is thereby moved downwardly and moves the spring latch downwardly so that the stop face 43 of the spring latch is released from the opening 35. The unit comprising the carrier 13 and the track portion 14 now swings around in the direction of rotation 47 under the action of the spring 15. The car located on the track portion 14 is accelerated, since the barrier 29 prevents the car from travelling backwards. The carrier 13 travels under the guide portions 24, 23 at the exit 17. The momentum of the carrier 13 is slightly buffed by the spring 22. The carrier 13 then strikes against the stop 21. The longer and heavier portion 38 of the trigger 36 pivots forwardly due to inertia, and its end face 40 is applied against the oblique surface 41. The arm 38 then forms a part of the track.

The car accelerated together with the track portion 14 runs at a high speed from the track portion 14 down onto the outgoing track 19 shown on the right in FIG. 1.

A different embodiment of the device constructed in accordance with the invention is illustrated in FIGS. 3 to 5. The base part 11' comprises a baseplate 51 which also serves as an entry and exit track. The connection pieces 18 for the contiguous tracks 19 are mounted on the front end and the rear end of the baseplate 51. Two cheeks 52 are joined to the baseplate 51 at the sides thereof, one portion of each cheek being extended upwardly to form supports 53. The carrier 13' is arranged so as to be pivotable about the axle 12' which is carried by the supports 53 arranged one on each side of the baseplate. The carrier comprises two support arms 54 whose ends remote from the axle 12' are connected to each other by means of the track portion 14'.

The track portion 14' is curved in the shape of an arc of its circle of rotation whose lowest point is located only slightly above the baseplate 51. The track portion 14' is surrounded outwardly by two chamferings 56, 57 which extend from the front end and the rear end of the track portion 14' substantially in the direction of the tangents to the circle of rotation. The two chamferings 56 and 57 meet at an obtuse angle on the centerline of the unit formed by the carrier and the track portion.

It will be seen from FIGS. 3 and 4 that one or other of the chamferings 56, 57 abuts against the baseplate 51 of the base part 11 when the unit comprising the carrier and the track portion is in its two resting positions. The chamferings 56, 57 form stops for the unit.

The entry and the exit are located at the same point in the illustrated embodiment. The trigger mechanism 34 retains the carrier track portion unit in the cocked position illustrated in FIG. 3 when the spring 15 is in its stressed state. The trigger mechanism 34' essentially comprises the same parts as the trigger mechanism 34 illustrated in FIG. 2. The spring latch 42' is mounted on a gantry 58 and is tripped by the trigger 36'. As may be seen from FIG. 5, this trigger mechanism differs from the trigger mechanism illustrated in FIG. 2 in that the running surface 26' of the track portion 14' is curved. Furthermore, the chamferings 56, 57 would obstruct the operation of the spring latch 42'. To prevent this, the spring latch 42' runs in a slotlike recess 59 whose bottom surface 60 extends parallel to the running surface 26'. The end of the spring latch connected to the gantry 58 on the base part is of such a length that the unit comprising the carrier and the track portion provided with the chamferings 56, 57 can rotate without striking against the gantry 58. Advantageously, the slotlike recess 59 in the chamferings 56, 57 can be arranged on the centerline of the track portion 14'. Alternatively, however, it is possible for the triggering operation to be effected from one or from both sides of the unit comprising the carrier and the track portion. For this purpose, the trigger 36' could have lateral extensions which actuate the spring latch.

The track portion 14' is provided with a cover 28' whose sides are formed integrally with the support arms 54. This provides a partially rigid unit. In the same manner as in the embodiment illustrated in FIGS. 1 and 2, the track portion 14' has a barrier 29' to prevent the vehicle from travelling backwards. Two resilient tongues 61 are provided in the side cheeks 52 of the base part 11' and extend into the path of rotation and, shortly before the termination of the pivoting of the track portion, abut resiliently against the support arms 54. Thus, the violent impact of the chamfering 56 against the baseplate 51 is somewhat buffered. However, the buffering action must not be so great that the vehicle leaves the track portion 14' prematurely.

The device illustrated in FIGS. 3 to 5 operates as follows:

The device cocked against the force of the spring 15 is in the position illustrated in FIG. 3. In the manner described with reference to FIG. 2, the trigger mechanism 34' latches in at the end of the cocking operation. A model vehicle 27a travels in from the right hand side from the incoming track 19 and onto the baseplate 51 and then into the track portion 14'. The model vehicle travels through the barrier 29' which again closes behind the model vehicle. Due to its momentum, the model vehicle runs up the upwardly curved running surface 26' and strikes against the trigger 36' (see model vehicle 27b). The trigger mechanism 34' is thereby tripped, and the unit comprising the carrier and the track portion is swung around in the direction of rotation 47' by the spring 15'.

During this rotary movement, the unit passes through a point which is illustrated by dash-dot lines in FIG. 3 and in which the model vehicle 27c is located in the upside-down position. However, the model vehicle cannot fall out of the track portion, since it is retained by the cover 28'. Furthermore, the spring is advantageously dimensioned so that, when the unit is in the position illustrated by dash-dot lines, the angular velocity and thus the centrifugal force are such that the wheels of the model vehicle remain on the running surface 26'. After slight buffering by the resilient tongues 61, the oblique surface 56 of the carrier/track portion unit strikes against the baseplate 51. Due to its inertia, and assisted by the slope of the running surface 26, the model vehicle 27d leaves the track portion 14' at a great speed and runs across the baseplate 51 onto the contiguous outgoing track 19.

The satisfactory operation of the device illustrated in FIGS. 3 to 5 is surprising in that one would assume that, during the last half of its rotation, the model vehicle has the tendency to fall out of the track portion 14', since it passes through a position in which it is directed vertically downwards with the front of the track portion 14' open. However, due to the force of the spring, the unit comprising the carrier and the track portion always accelerates the model vehicle to an extent which, in this region, is greater than the acceleration due to gravity. Thus, the model vehicle remains lightly pressed against the barrier 29' even in this critical portion and leaves the track portion only when the latter is retarded. Due to the relatively great speed at which the unit approaches the baseplate, it is very advantageous to provide adequate buffering in order to protect the device. In addition to the damping provided by the resilient tongues 61 already described, an element acting in the manner of a leaf spring can be incorporated for example in the baseplate 51, which element when in its unstressed state projects slightly above the baseplate 51 and absorbs the impact. Stops may be provided on the side cheeks in place of the chamfering 56 or in addition thereto. The curvature of the running surface 26' fulfills a plurality of functions. It forms a uniform transition between the horizontal position of the vehicle and the position which the model vehicles assume at the beginning and at the end of the accelerating operation (model vehicles 21b and 27d). Furthermore, due to the curvature, the model vehicles are held on the track in a satisfactory manner whilst they are rotating. For this purpose, and circumstances permitting, it very advantageous for the running surface 26' to have a greater degree of curvature than the circle of rotation. Centrifugal force then retains the vehicles in the trough or hollow formed, without being obstructed when they enter or leave the track portion 14'.

The device, illustrated in FIGS. 6 to 8, for accelerating model vehicles comprises a base part 11" which is normally manufactured from plastics material and which is in the form of a box, open at the top, having two lateral, outwardly directed guide flanges 65 in the region of its top edge. A track portion 14" is guided in the manner of a carriage on the elongate base part 11" in the longitudinal direction thereof. For this purpose, the track portion 14" is provided with lateral C-shaped extensions 66 which engage over the guide flanges 65. The track portion 14" has sidewalls 67 and, in the region of an entry 16", a portal 68 which extends across the track. A barrier 29" is mounted in the sidewalls in the region of the portal 68 so as to be pivotable about an overhead axle 31". The barrier 29" corresponds substantially to the barrier 29 already described and allows a model vehicle 27 to pass through in only one direction, i.e. from right to left in FIGS. 6 to 8. To buffer the impact upon the vehicle, the barrier is provided with a layer 69 of resilient material such as foam rubber.

As in the embodiment illustrated in FIGS. 1 and 2, there is provided at the front end of the tract portion 14" a stop mechanism 34" which is of substantially the same construction as the stop mechanism already described. The axle 37" of the trigger 36" is fixed in a plate 70 which is secured to the track portion 14". The plate 70 has two lateral lugs 71 which act upon a rib or bar 72 on the spring latch 42" and retain the carriage in its position at the entry 16". The spring latch 42" is screwed at one end to the base part 11" and is in the shape of a horizontal flattened sideways "S." The rib 72 extends transversely of the base part and extends through and out of a slot 73 at one side. A manual release lever 74 is provided on the rib 72 outside the base part 11".

A roller 75 is rotatably arranged externally on the base part in the vicinity of the exit 17", a rubber strand 76 being applied around the roller 75. One end of the rubber strand 76 is secured to a hook 77 on the track portion 14", and the other end is secured to a hook 78 on the base part in the vicinity of the entry.

The device illustrated in FIGS. 6 to 8 functions as follows:

To set the device, the carriagelike track portion 14" is shifted from the exit 17" to the entry 16", so that the rubber strand 76 is tensioned between the two hooks 77 and 78. The roller 75 ensures that the tension is distributed between the upper and lower runs of the strand in a substantially frictionless manner. It is to be noted that a particularly uniform tension can be obtained due to the fact that the strand 76 can be almost twice the length of the entire device, i.e. adequate tension is available in the vicinity of the entry without having to overstretch the rubber strand 76.

The chamfered rear sides of the lugs 71 ride onto the rib 72 and depress the spring latch 42" when the track portion is drawn back towards the entry 16". When the track portion 14" is located in the position illustrated in FIG. 6, the rib 72 is freed from the lugs 71 and snaps upwardly under the action of the spring force of the spring latch 42". The track portion 14" is thus locked at the entry 16". The trigger 36" is urged into its upright position, illustrated in FIG. 6, when its angled end 39 runs on the upward bend of the spring latch 42". Thus, the device is cocked ready to accelerate a model vehicle.

When a model vehicle 27 on the connecting incoming track 19 reaches the entry 16", it strikes against, and opens, the barrier 29" which normally hangs downwardly under the effect of gravity. Gravity closes the barrier behind the model vehicle which has entered. The model vehicle then travels further along the track portion 14" and strikes against the trigger 36" which is thus pivoted in the anticlockwise direction. The arm 39" depresses the rib 72, whereby the lugs 71 are released from the rib 72 and the track portion 14" is moved towards the exit 17" under the action of the rubber strand 76. The barrier 29" prevents the model vehicle from travelling backwards out of the track portion during the accelerating operation. The layer 69 prevents damage to the vehicle.

The track portion 14" terminates its movement at the exit 17" either by striking against a stop or by being decelerated by buffering or shock-absorbing devices such as have already been described. However, as a result of its inertia, the model vehicle continues to travel and leaves the track portion 14'' at an increased speed. The trigger 36'' is thereby lowered into an opening 35'' in the track portion 14'' as may be seen in FIG. 7. The trigger is flipped over either during decelerating by virtue of the fact that the top portion of the trigger is heavier and is thus moved forwardly during the retardation, or by the impact of the model vehicle. It remains to be mentioned that two lateral projections 79 are provided on the arm 39'' of the trigger and prevent the latter from being pivoted in the clockwise direction beyond the position to its upright position. The projections 79 abut against the track portion 14'' from below. The front of the trigger 36'' has a thickened portion 80 which ensures that the triggering operation is reliably effected irrespective of the type of vehicle used.

I claim:

1. A device for accelerating model vehicles comprising a base part having an entry and an exit; a track portion adapted to receive a vehicle to be accelerated; means mounting said track portion on said base part for movement from said entry to said exit; resilient means acting between said track portion and said base part and biasing said track portion towards said exit; a trigger mechanism for holding said base part adjacent said entry; and a movable barrier on said track portion to prevent a vehicle on the base part from running back when the trigger mechanism is tripped.

2. A device according to claim 1 in which said trigger mechanism includes a trigger extending into the path of a vehicle entering said track portion from said entry so as to be struck by said entering car to strip the trigger mechanism.

3. A device according to claim 2 in which said track portion has an opening therein and said trigger is so pivoted on said track portion that it is displaced into said opening thereof when the trigger is tripped.

4. A device according to claim 3 in which said trigger comprises a cranked lever pivotally mounted on the track portion and in which the trigger mechanism also includes a spring latch resiliently secured to said base part, said latch being adapted to engage said track portion, said cranked lever having an arm adapted to act on said spring latch for tripping the latter.

5. A device according to claim 4 in which said spring latch has a stop face cooperable with the edge of said opening in said track portion.

6. A device according to claim 4 in which said spring latch is of a somewhat S-shape and comprises resilient plastics material, said latch having a first end facing against the direction of travel of the vehicle to be accelerated with a latch face and a chamfer on said first end, a central portion extending substantially parallel to said track portion, said trigger lever arm acting on said central portion, and a second end opposite said first end and having a chamfer thereon and being fixed to said base part.

7. A device according to claim 1 in which said barrier comprises a flap, a bearing journaling said flap on said track portion so that said flap depends downwardly from said bearing into the path of a vehicle entering said track portion from said entry so as to be displaced by said vehicle, and stop means on said flap preventing said flap from being displaced by said vehicle in an opposite direction.

8. A device according to claim 1 including a tunnellike cover on said track portion.

9. A device according to claim 1 including buffering means for said track portion.

10. A device according to claim 9 in which said buffering device comprises a spring.

11. A device according to claim 1 in which connecting pieces are provided on said base part for the connection thereto of incoming and outgoing tracks.

12. A device according to claim 1 in which said mounting means comprise a carrier, and means journaling said carrier to said base part about a substantially vertical axis, said track being on said carrier and said entry and exit being spaced by an angle of 180°.

13. A device according to claim 12 including respective guide means on said base part adjacent said entry and exit for overlapping said carrier at said entry and exit to vertically align said carrier.

14. A device according to claim 12 including a positive step at said exit for said carrier and track portion.

15. A device according to claim 1 in which said mounting means comprises a carrier and means journaling said carrier to said base part about a substantially horizontal axis, said track portion being on said carrier and the entry and exit being spaced by an angle of substantially 360°.

16. A device according to claim 15 in which said track portion has a curved running surface, the degree of curvature of said running surface being at least as great as the degree of curvature of the circle of rotation of said running surface about said horizontal axis.

17. A device according to claim 15 in which said base part comprises a baseplate defining said entry and exit and two lateral supports, said journaling means including an axle extending between said lateral supports and in which said carrier comprises two support arms engaging said axle, said track portion being disposed between said support arms.

18. A device according to claim 1 in which the resilient means comprises a spiral spring.

19. A device according to claim 1 in which the resilient means comprises a rubber band.

20. A device according to claim 1 in which said mounting means comprises guide means guiding said track portion for movement in a straight line between said entry and said exit.

21. A device according to claim 20 in which said trigger mechanism includes a vehicle-actuated trigger pivotally mounted on said track portion and a spring latch fixed by a spring portion to said face and having a spring-mounted portion extending transversely to the direction of movement of the track portion, said track portion having lugs thereon adapted to be engaged by spring-mounted portion, said trigger cooperating with said spring-mounted portion for tripping said spring latch.

22. A device according to claim 21 including a manually operable trip lever on said spring-mounted portion.

23. A device according to claim 20 in which a guide member is provided on said base part adjacent said exit and in which said resilient means comprises at least one rubber strand secured by one end to said base part, passing around said guide member and secured by an opposite end to said track portion.

UNITED STATES PATENT OFFICE
CERTIFICATE OF CORRECTION

Patent No. 3,600,849                  Dated August 24, 1971

Inventor(s) Edwin Faller

It is certified that error appears in the above-identified patent and that said Letters Patent are hereby corrected as shown below:

Column 4, line 13, "buffed" should read -- buffered --; line 74, after "formed" insert -- by the support arms 54, while the top of the cover can be formed --; line 75, "partially" should read -- particularly --. Column 7, line 6, "decelerating" should read -- deceleration --; line 12, after "position", first occurrence, insert -- illustrated in Fig. 6 when the trigger is returned --. Column 8, line 19, "step" should read -- stop --.

Signed and sealed this 25th day of April 1972.

(SEAL)
Attest:

EDWARD M. FLETCHER, JR.
Attesting Officer

ROBERT GOTTSCHALK
Commissioner of Patents